(12) United States Patent
Milheim

(10) Patent No.: US 12,176,770 B2
(45) Date of Patent: Dec. 24, 2024

(54) METHOD FOR PLACING MAGNET SEGMENTS FOR AN AXIAL FLUX MACHINE

(71) Applicant: E-Circuit Motors, Inc., Needham Heights, MA (US)

(72) Inventor: George Harder Milheim, Bozeman, MT (US)

(73) Assignee: E-Circuit Motors, Inc., Needham Heights, MA (US)

( * ) Notice: Subject to any disclaimer, the term of this patent is extended or adjusted under 35 U.S.C. 154(b) by 0 days.

(21) Appl. No.: 18/425,454

(22) Filed: Jan. 29, 2024

(65) Prior Publication Data

US 2024/0291361 A1 Aug. 29, 2024

Related U.S. Application Data

(60) Provisional application No. 63/448,212, filed on Feb. 24, 2023.

(51) Int. Cl.
*H02K 15/03* (2006.01)
*H02K 15/12* (2006.01)

(52) U.S. Cl.
CPC ............. *H02K 15/03* (2013.01); *H02K 15/12* (2013.01); *H02K 2215/00* (2021.08); *Y10T 29/49012* (2015.01)

(58) Field of Classification Search
CPC .......... H02K 15/03; H02K 5/02; H02K 15/02; Y10T 29/49012
USPC ................................. 29/598, 596, 602.1, 604
See application file for complete search history.

(56) References Cited

U.S. PATENT DOCUMENTS

| 4,144,637 | A | 3/1979 | Ioffe et al. | |
|---|---|---|---|---|
| 7,523,540 | B2 | 4/2009 | Morel | |
| 8,424,189 | B2 | 4/2013 | Doi et al. | |
| 9,467,015 | B2 | 10/2016 | Langford et al. | |
| 10,447,102 | B2 * | 10/2019 | Patterson | H02K 1/2795 |
| 10,770,940 | B2 | 9/2020 | Thiele et al. | |
| 11,121,614 | B2 * | 9/2021 | Milheim | H02K 3/26 |
| 2009/0295245 | A1 | 12/2009 | Abe et al. | |

(Continued)

FOREIGN PATENT DOCUMENTS

| CA | 2790384 C | 3/2013 |
|---|---|---|
| CN | 207968113 U | 10/2018 |

(Continued)

OTHER PUBLICATIONS

International Search Report and Written Opinion issued Jun. 18, 2024 for International Patent Application No. PCT/US2024/013648.

*Primary Examiner* — Thiem D Phan
(74) *Attorney, Agent, or Firm* — Pierce Atwood LLP

(57) ABSTRACT

According to one disclosed method, a magnet segment may be slid linearly along a first surface and onto a second surface of a back iron of a rotor, wherein the first surface is disposed at or above a rim that extends upwardly from the second surface at an outer edge of the back iron to enable the magnet segment to slide over the rim before the magnet segment is slid onto the second surface. According to another disclosed method, a first end of a magnet segment may be pressed against an elastic member located at an inner portion of a back iron for a rotor so that force exerted by the elastic member pushes a second end of the magnet segment against a rim located at an outer portion of the back iron.

24 Claims, 8 Drawing Sheets

(56) References Cited

U.S. PATENT DOCUMENTS

2011/0241460 A1  10/2011  Mebarki et al.
2022/0255379 A1   8/2022  Rossi et al.

FOREIGN PATENT DOCUMENTS

| | | |
|---|---|---|
| CN | 108923601 A | 11/2018 |
| CN | 208939698 U | 6/2019 |
| CN | 211018440 U | 7/2020 |
| CN | 112134381 A | 12/2020 |
| CN | 115473394 A | 12/2022 |
| EP | 2555393 A1 | 2/2013 |
| EP | 2571148 A1 | 3/2013 |
| JP | 2006025482 A | 1/2006 |
| JP | 2007215292 A2 | 8/2007 |
| JP | 4671250 B1 | 4/2011 |
| JP | 2017225247 A2 | 12/2017 |
| JP | 2022155209 A | 10/2022 |
| WO | 2022200379 A1 | 9/2022 |
| WO | 2022223798 A1 | 10/2022 |
| WO | 23279526 A1 | 1/2023 |

\* cited by examiner

METHOD FOR PLACING MAGNET SEGMENTS FOR AN AXIAL FLUX MACHINE

CROSS-REFERENCE TO RELATED APPLICATIONS

This application claims the benefit under 35 U.S.C. § 119(e) of U.S. Provisional Application No. 63/448,212, entitled SEGMENTED MAGNET PLACING APPARATUS FOR AXIAL FLUX MOTORS, filed Feb. 24, 2023, the entire contents of which are hereby incorporated by reference for all purposes.

BACKGROUND

Axial flux motors and generators described by several patents, including U.S. Pat. Nos. 7,109,625; 7,109,625; 10,170,953; 9,859,763; 10,211,694; and 10,256,690, the entire contents of which are incorporated herein by reference, feature a generally planar printed circuit board stator assembly interposed between magnets magnetized with alternating north-south poles. These magnets may be affixed to a shaft via a "back iron" for connection to a mechanical load (or source for a generator). The back iron may also serve as a flux return path for the magnets, providing a high permeability connection between adjacent poles.

SUMMARY

In accordance with one example embodiment of the present disclosure, a method involves sliding a magnet segment linearly along a first surface and onto a second surface of a back iron of a rotor, wherein the first surface is disposed at or above a rim that extends upwardly from the second surface at an outer edge of the back iron to enable the magnet segment to slide over the rim before the magnet segment is slid onto the second surface.

In accordance with another example embodiment of the present disclosure, a method involves pressing a first end of a magnet segment against an elastic member located at an inner portion of a back iron for a rotor so that force exerted by the elastic member pushes a second end of the magnet segment against a rim located at an outer portion of the back iron.

DETAILED DESCRIPTION

Figure 1:
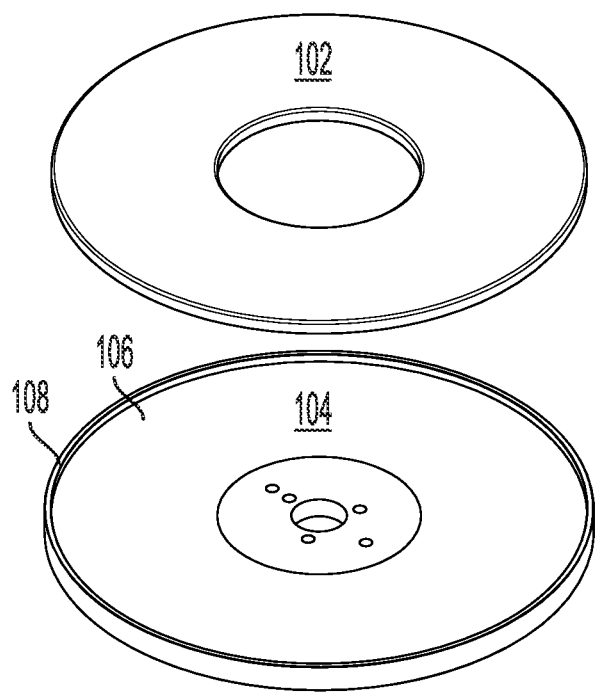
FIG. 1 shows components of a conventional rotor structure including a ring magnet and a corresponding back iron.
Figure 2:
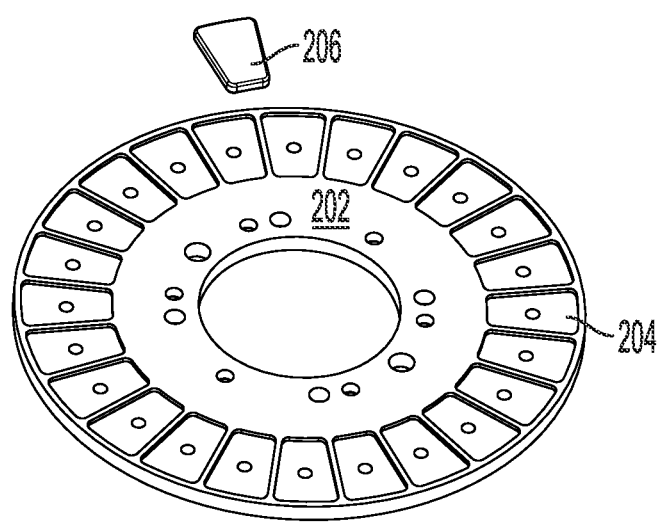
FIG. 2 shows components of a conventional rotor structure including a back iron with individual pockets for respective magnet segments.

Some previous axial flux motor/generator designs have used ring magnets which require a very simple back iron to function. An example of such a ring magnet 102 and corresponding back iron 104 are shown in FIG. 1. As shown, the back iron 104 for the ring magnet 102 may include a simple disc structure 106 with a rim 108 at its outer diameter. Other previous designs have used segmented magnets rather than ring magnets. Some such designs have employed back irons with pockets to hold individual magnet segments. An example of a back iron 202 which has individual pockets 204 for respective magnet segments 206 is shown in FIG. 2. But the configuration of these types of back irons 202 tends to be fairly complex, making them difficult and expensive to manufacture. Further, the need to place individual magnet segments 206 onto a back iron 202 presents additional challenges compared to a ring magnet (example techniques for placing a ring magnet onto a back iron are disclosed in U.S. Pat. No. 9,673,688, the entire contents of which are incorporated herein by reference), as each magnet segment 206 must be individually located and a large quantity of individual components must be placed.

It can nonetheless be desirable to use magnet segments 206 rather than a ring magnet 102, at least for certain applications, as ring magnets 102 (such as shown in FIG. 1) have some significant disadvantages compared to magnet segments 206 (such as shown in FIG. 2). For example, ring magnets 102 require a custom magnetization jig, are available only up to a certain diameter, and produce magnetic poles that are less consistent than magnet segments 206.

In accordance with some embodiments of the present disclosure, magnet segments 206 may be located using a jig 302 (shown in FIG. 3) and a rim 402 (shown in FIG. 4) integral to a back iron 404 of the rotor. The rim 402 may be configured and arranged to resolve the centripetal force exerted on individual magnet segments 206, so that the resulting rotor assembly 1100 (shown in FIGS. 11 and 12) may rely on an adhesive only for angular constraint. The present disclosure also provides a method of assembling magnet segments 206 onto the back iron 404 using the jig 302 which can be easily automated for large volume production. In some implementations, the jig 302 may be removed from the back iron 404 after it is used to arrange the magnet segments 206 on the back iron 404. In other implementations, the jig 302 may be left in place on the back iron 404 and included as a component of a completed rotor assembly. In some implementations, a magnetization step may be added in the assembly process, thus allowing the use of unmagnetized magnets which are more easily handled and shipped from the manufacturer.

The present disclosure also introduces an apparatus for placing individual magnet segments 206 onto a back iron 404 to produce a rotor assembly 1100, which apparatus allows a much more easily manufactured back iron 404 to be used while retaining accurate magnet segment 206 placement and resolving the centripetal force on the magnet segments 206 when the rotor assembly 1100 is rotating.

Previous designs have used ring magnets 102 which are magnetized using a magnetization jig to have the alternating, axial poles needed to create the alternating axial magnetic field through a stator that is used to create torque in a motor or respond to torque in a generator. Ring magnets 102 are complicated to produce and result in wasted rare earth material between the poles and in the center hole. A ring magnet 102, due to its size, can also have significant variations in field strength as it must be cut from a large ingot and it is difficult to align the domains of the magnetic particles consistently across a large piece, resulting in higher variability in the field strength. Further, due to the requisite size of processed magnetic material, one piece ring magnets 102 are typically limited to diameters of less than six inches. Segmented magnets which form a single pole for each part produce less wasted material, do not require a custom magnetization jig, produce poles which are more consistent, and are available for larger diameter designs.

Placement of magnet segments 206 onto a back iron presents additional challenges compared to a ring magnet 102. During assembly, the attraction of the magnet segments 206 to each other causes them to move if they are not constrained angularly and radially. If an adhesive is used between the back iron and the magnet segments 206, it can act as a lubricant prior to curing and the movement problem can be exacerbated.

One solution (illustrated in FIG. 2) is to use a back iron 202 which has individual pockets 204 for the magnet segments 206, which is complex and expensive to manufacture. Each pocket 204 must be held to a tight tolerance to prevent movement of the magnet segment 206 and the small corner radius of the pocket requires the use of small tools. By contrast, a back iron 104 for a ring magnet 102 (illustrated in FIG. 1) has only large concentric circular features, and can be machined with large tools on a mill or lathe.

The novel jig 302 disclosed herein (shown in FIG. 3) advantageously facilitates the placement of magnet segments 206 onto a back iron 404 of the type conventionally used for ring magnets 102, thus achieving the benefits of employing magnet segment 206 while maintaining the ease of manufacture of the back iron 404. As described below in connection with FIGS. 5 and 6, for example, the jig 302 shown in FIG. 3 may be attached to the back iron 404 shown in FIG. 4 to form an assembly 500.

Figure 3:
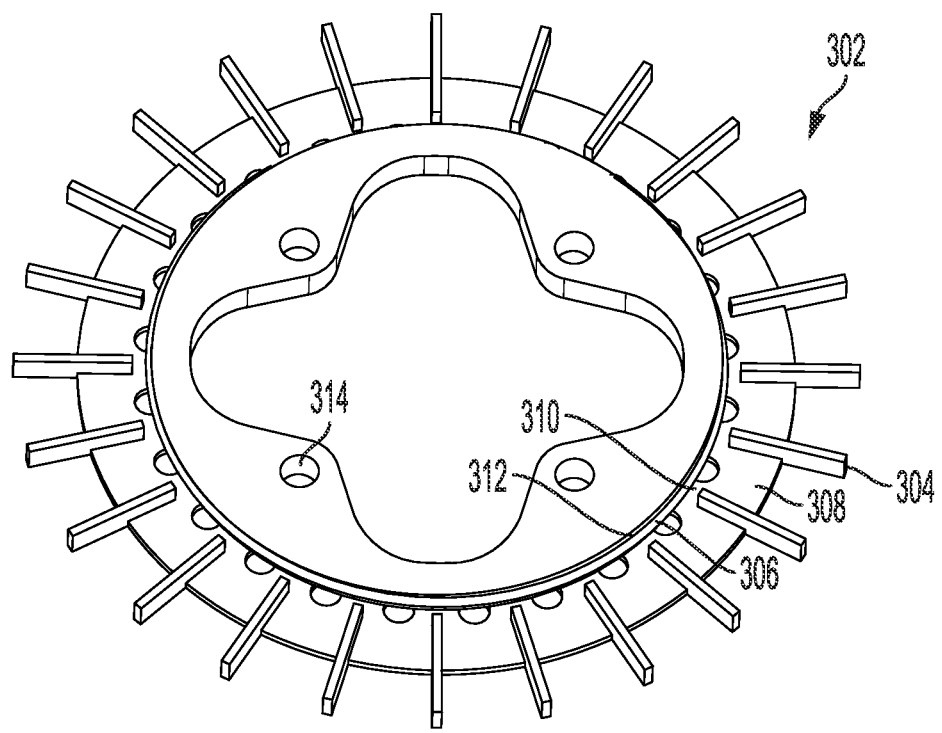
FIG. 3 shows an example jig that may be used to facilitate the placement of magnet segments onto a back iron to produce a rotor structure, in accordance with some embodiments of the present disclosure.

As shown in FIG. 3, the jig 302 may have spacers 304 to angularly locate the magnet segments 206. The spacers 304 may be attached to an annular region 308 of the jig 302. Further, as described in more detail below, the jig 302 may also have a mechanism to push the magnet segments 206 against a rim 402 that is positioned at an outer diameter of the back iron 404 for radial location. In some implementations, such mechanism may include an elastic member, such as an elastic O-ring 306 or a spring that compresses when the magnet segment 206 is inserted, that is arranged to be located at an inner portion of the back iron 404 when the jig 302 is attached to the back iron 404. An annular space 310 may be provided between the spacers 304 and an inner rim 312 of the jig 302 to facilitate placement of the elastic member, e.g., the O-ring 306, about the inner rim 312. In some implementations, the rim 402 that is positioned at an outer diameter of the back iron 404 may be integral with the back iron 404, such as in the implementation shown in FIGS. 4-6. In other implementations, the rim 402 may instead be a component of the jig 302. As used herein, one component is "integral" with another component when the two components are formed or attached in such a way that they cannot be separated without damaging at least one of the components.

An adhesive may be placed between the magnet segments 206 and the back iron 404 before the magnet segments are introduced onto the back iron 404. When a magnet segment 206 is inserted into a pocket 204 and one end of the magnet segment 206 is pressed against the elastic member, the elastic force generated by the elastic member may push the other end of the magnet segment against the rim 402. The elastic member may thus apply a radial force on the magnet segment 206, pushing it against the rim 402 until the adhesive has at least partially cured.

In some implementations, during operation of a rotor assembly 1100 (shown in FIGS. 11 and 12) produced using the jig 302, the centripetal force may be resolved by the rim 402 such that the adhesive is not stressed by that force. The back iron 404, which is typically made of steel, may be readily manufactured, for example, by turning on a lathe, to generate simple concentric features, such as a center hole 406 of accurate diameter and, in some embodiments, the rim 402.

In some implementations, the jig 302 may be removable and reusable with minimal requirement for strength and no requirement for magnetic properties. In other implementations, the jig 302 may be left in place on the back iron 404 after it is used to locate the magnet segments 206 on the back iron 404 and may thus be included as a component of a completed rotor assembly. In either case, the jig 302 may be made from a variety of materials, such as plastic and/or aluminum. It may be made in different ways including, but not limited to, computer numerical control (CNC) machining or three-dimensional (3D) printing. It may have a complex geometry, which may be difficult to produce, but, in at least some cases, it may be used to construct many rotor assemblies 1100, as it need only remain in place until the adhesive between the magnet segments 204 and the back iron 404 is at least partially cured.

Figure 4:
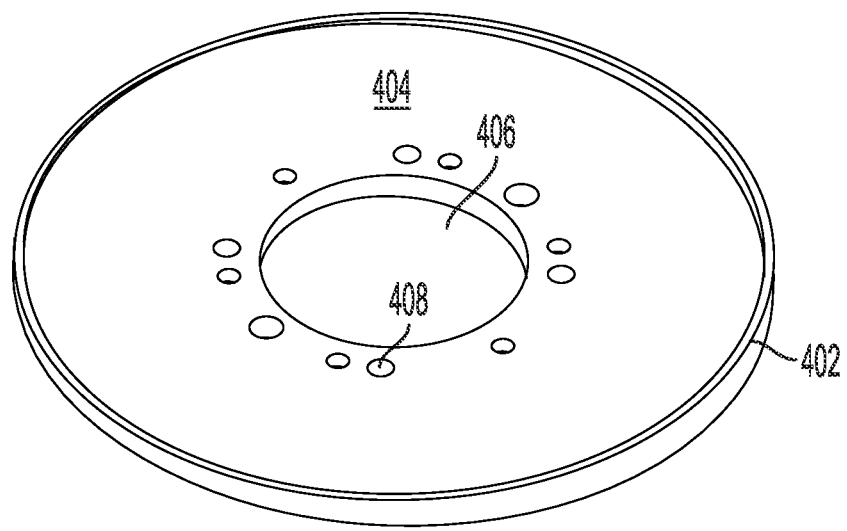
FIG. 4 shows an example back iron that may be used in conjunction with the jig shown in FIG. 3, in accordance with some embodiments of the present disclosure.

An example process for using the jig 302 will now be described. As an initial step, the jig 302 may be properly positioned on and attached to the back iron 404. This may be accomplished, for example, by locating and attaching the jig 302 with screws 502 (shown in FIGS. 5 and 6) to form the assembly 500. As shown in FIGS. 3 and 4, in some implementations, the jig 302 may include holes 314 that can be aligned with corresponding holes 408 that are drilled or otherwise formed in the back iron 404, and the screws 502 can be threaded into or otherwise secured within the aligned holes 314, 408. In implementations in which the jig 302 is to remain in place on the back iron 404 after being used to locate magnet segments 206, lower profile screws 502 and/or recessed holes 314 may be employed to keep the upper surface of the resulting rotor assembly relatively flat.

In some implementations, the jig 302 may additionally or alternatively include a circular boss (not illustrated) that may be used to locate the jig 302 on the back iron 404 by mating the circular boss with the center hole 406 of the back iron 404, which is generally a precision feature, and the jig 302 may then be secured with screws 502.

Figure 5:
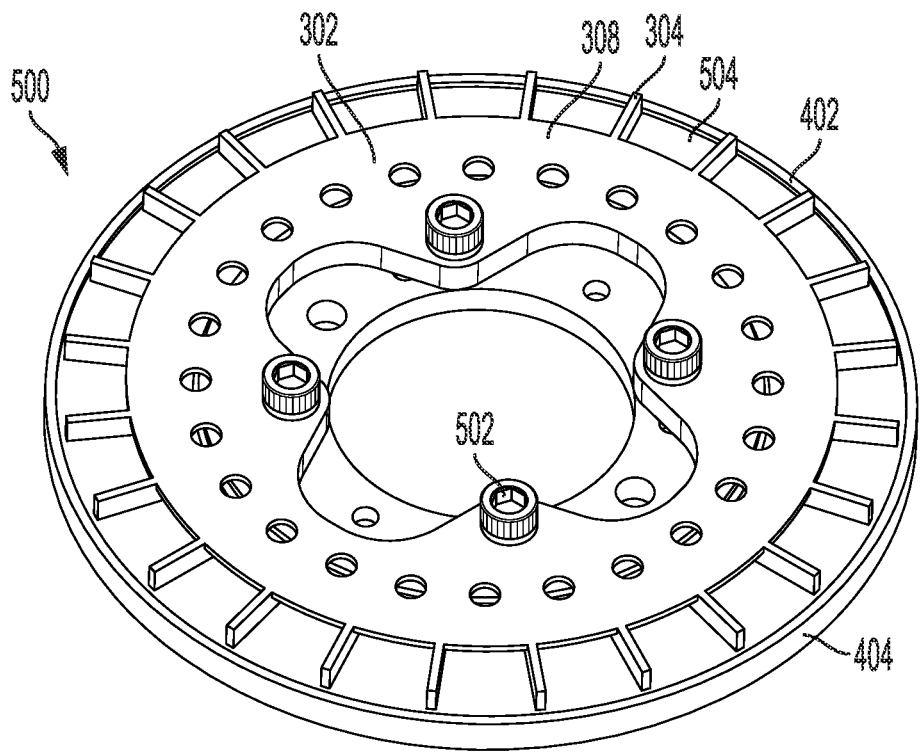
FIG. 5 illustrates how the jig shown in FIG. 3 may be attached to the back iron shown in FIG. 4, in accordance with some embodiments of the present disclosure.

Other mechanisms of securing the jig 302 to the back iron 404, which may be faster to implement in high volume production, may additionally or alternatively be employed in some implementations. As shown in FIG. 5, when the jig 302 is attached to the back iron 404, pairs of the spacers 304 may form pockets 504 that are adapted to receive respective magnet segments 206.

Figure 6:
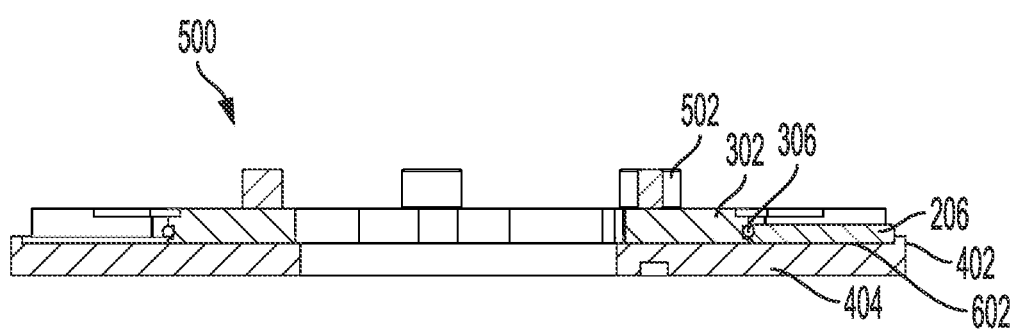
FIG. 6 is a sectional view of the assembly shown in FIG. 5.

With the jig 302 attached to the back iron 404 (as shown in FIGS. 5 and 6), an adhesive, such as Loctite AA331, may be applied to the regions of the back iron 404 within the pockets 504. Some adhesives may require an activator, such as Loctite SF7387, to be applied to the back iron 404 prior to the adhesive. The use of such an adhesive may constrain the magnet segments 206 angularly after the jig 302 is removed. It may be desirable to use a fast-curing adhesive to minimize the amount of time required for the jig 302 to be in place on the back iron 404 after the magnet segments 206 are placed.

After the adhesive is applied, a magnet segment 206 may be placed into one of the pockets 504 and pressed radially inward against the elastic member, e.g., the O-ring 306, of the jig 302 until an outer edge of the magnet segment 206 slides over the rim 402 and a bottom portion of the magnet segment 206 becomes flush with an upper surface 602 of the back iron 404, as illustrated in FIG. 6. In the uncured state, the adhesive may act as a lubricant, thus allowing the elastic force generated by the elastic member, e.g., the O-ring 306, of the jig 302 to push the magnet segment 206 against the rim 402 of the back iron 404. This process may be repeated for the quantity of magnet segments 206 needed to complete the rotor assembly 1100. In implementations in which the jig 302 is to be removed from the back iron 404 after it is used to locate the magnet segments 206, the jig 302 may be left in place at least until the adhesive is cured, or partially cured enough that the jig 302 can be removed without disturbing the magnet segments 206. The jig 302 may then be removed from the back iron 404 (e.g., by removing the screws 502) and used to assemble a subsequent rotor assembly 1100.

Figure 7:
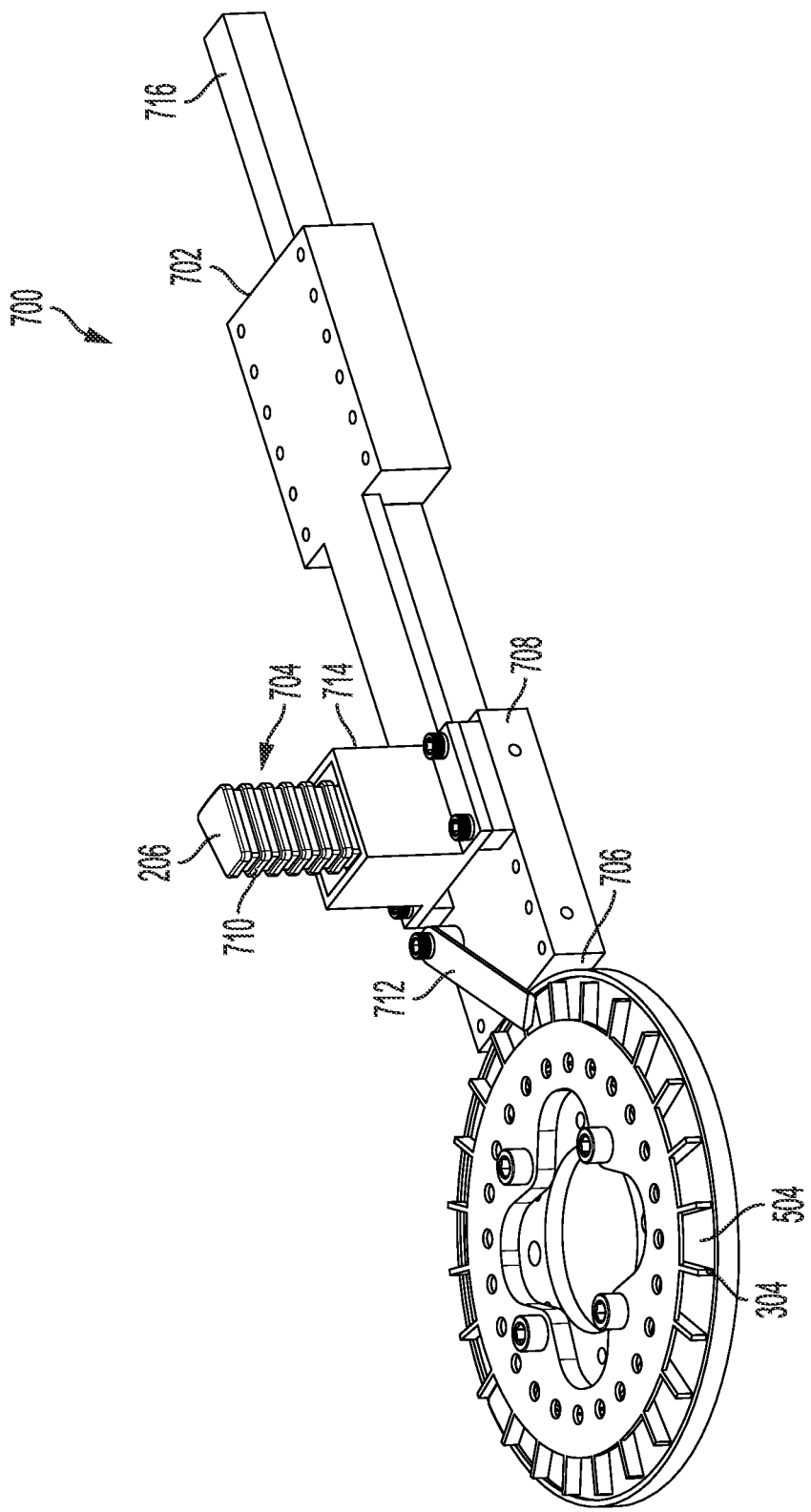
FIG. 7 is a perspective view of a example magnet placement device that may be used to place magnet segments into the assembly shown in FIGS. 5 and 6, in accordance with some embodiments of the present disclosure.
Figure 8:
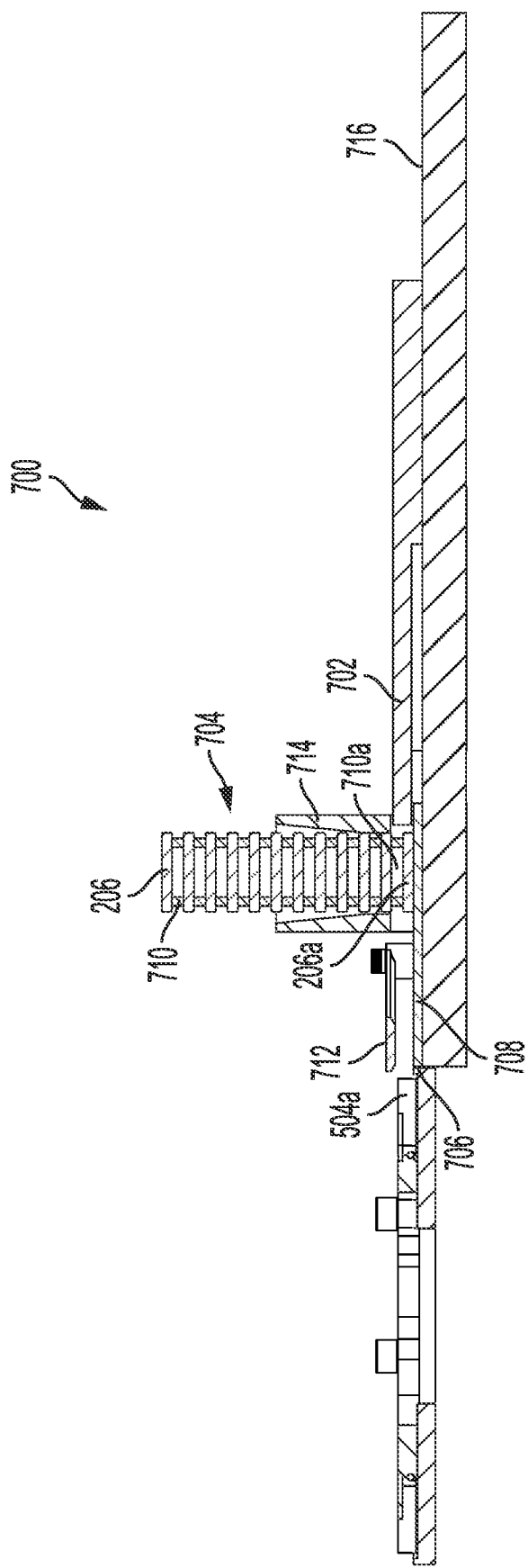
FIG. 8 is a cross-sectional side view of the example magnet placement device shown in FIG. 7.

FIGS. 7 and 8 show a perspective view and a cross-sectional side view, respectively, of a first example magnet placement device 700 that may be used to place the magnet segments 206 into the pockets 504 in accordance with some embodiments of the present disclosure. As seen best in FIG. 8, the magnet placement device 700 may include a pushing member (e.g., a push block 702) that can be slid along a guide rail 716 to separate a magnet segment 206a from the bottom of a stack 704 of magnet segments 206 disposed in a magazine 714 and then push the magnet segment 206a along an upper surface of a slide table 708 of the magnet placement device 700 and into a pocket 504a that is aligned with an end 706 of the slide table 708. The slide table 708 may be rigidly affixed to, or integrated with, the guide rail 716.

Magnetized magnets are typically supplied in a stack 704 with spacers 710 to reduce the force between adjacent magnet segments 206. Accordingly, in some implementations, a component (e.g., spacer ejector 712) of the magnet placement device 700 may be used to eject a spacer 710a as the magnet segment 206a moves linearly along the slide table 708 toward the pocket 504a. In the illustrated example, the spacer ejector 712 comprises an angled bar that has a clearance over the top of the magnet segment 206a but catches the spacer 710a, thus pushing the spacer 710a off the magnet segment 206a. This process may be repeated for the quantity of magnet segments 206 needed to complete the rotor assembly 1100.

For the magnet placement device 700 shown in FIG. 7, since all of the magnet segments 206 in the stack 704 have their north poles oriented in one direction (e.g., upward) and their south poles oriented in the opposite direction (e.g., downward), only one polarity of magnet segment may be placed at a time without reloading the magazine 714 or flipping the stack 704 upside-down. Accordingly, with such an apparatus, both polarities may be placed by placing all the upwardly facing south poles first, and then flipping the stack 704 of remaining magnet segments 206 upside-down (or loading a new stack 704 of oppositely oriented magnet segments 206) and placing all the upwardly facing south poles, or vice versa. In other implementations, at least one additional magnet placement device 700 may be employed, e.g., positioned to load magnet segments into pockets 504 that are angularly offset from the pockets 504 loaded by the other magnet placement device 700, with one magnet placement device 700 set up to place upwardly facing north poles and the other magnet placement device 700 set up to place upwardly facing south poles.

In some implementations, the guide rail 716 of the magnet placement device 700 may be constructed of a soft magnetic material, such as steel, to which the magnet segments 206 will be attracted, or at least a portion of the guide rail 716 may include an elongated soft magnetic member, e.g., a steel rod oriented in the direction of movement of the magnet segments 206. In such implementations, the magnet segments 206 may align to this soft magnetic feature on their longest axis, which is typically the desired orientation of the magnet segments 206 for placement into the pockets 504 of the jig 302. A guide rail 716 configured in such a manner may thus keep the magnet segments 206 aligned in the correct orientation for placement until they are inserted into the pockets 504.

In some implementations, the magnet placement device 700 may be operated manually, e.g., by aligning a pocket 504 of the jig 302 on the back iron 404 with the end 706 of the slide table 708 and actuating the push block 702 by hand to push a magnet segment 206 from the stack 704 into the pocket 504. In other implementations, one or more operations of the magnet placement device 700 may be partially or fully automated, as described in more detail below.

Figure 9A:
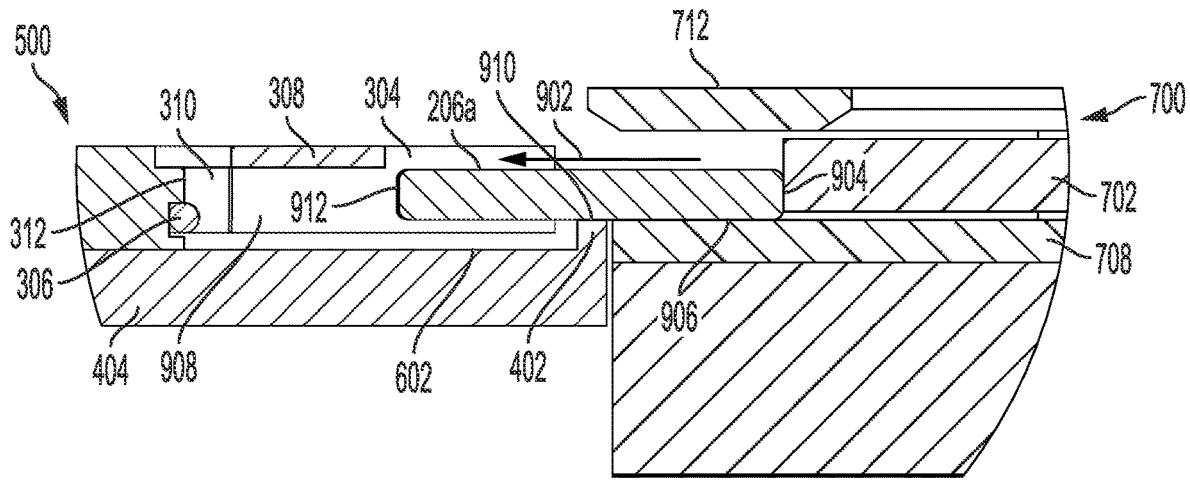
FIGS. 9A, 9B, and 9C are cross-sectional views of a portion of the example magnet placement device shown in FIGS. 7 and 8, illustrating steps in an example process for placing magnet segments onto the back iron of the assembly shown in FIGS. 5 and 6, in accordance with some embodiments of the present disclosure.
Figure 9B:
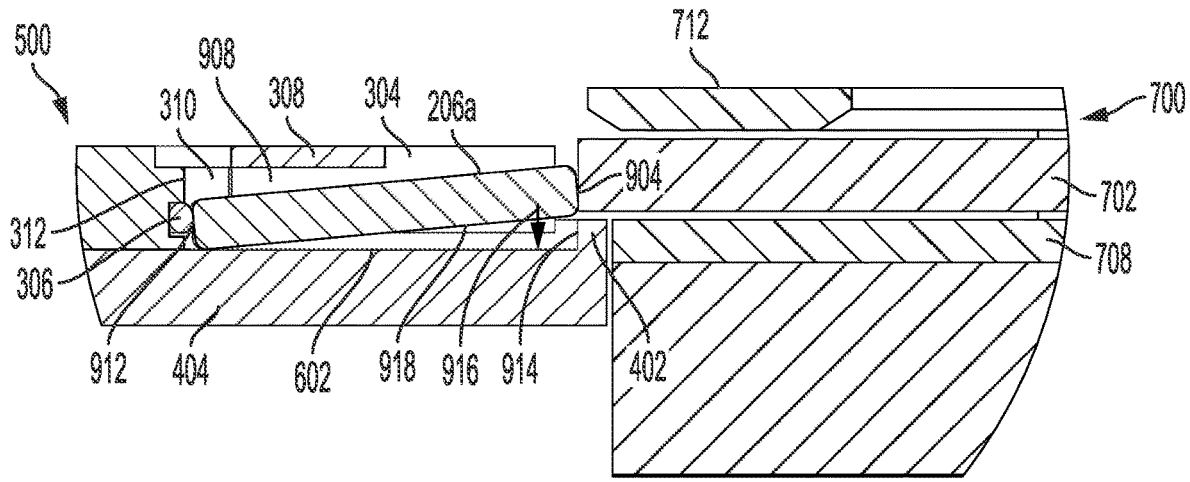
Figure 9C:
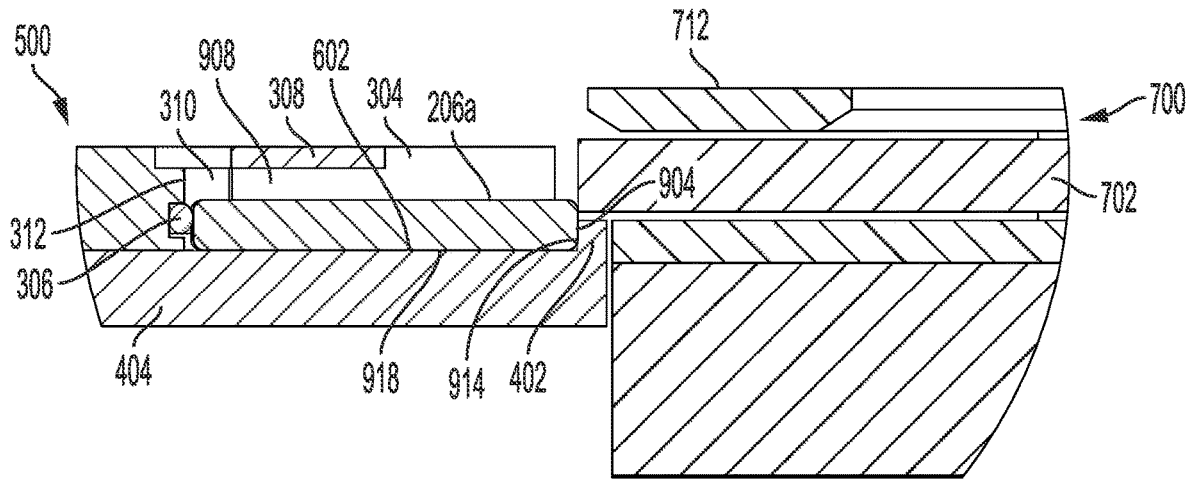

FIGS. 9A, 9B, and 9C are cross-sectional views of a portion of the example magnet placement device 700 shown in FIGS. 7 and 8, illustrating steps in an example process for placing a magnet segment 206a onto the back iron 404 of the assembly 500 shown in FIGS. 5 and 6.

As indicated by an arrow 902 in FIG. 9A, the push block 702 of the magnet placement device 700 may contact a first end 904 of the magnet segment 206a and push the magnet segment 206a linearly along an upper surface 906 of the slide table 708 of the magnet placement device 700 and toward a cavity 908 defined by the annular region 308 of the jig 302, a pair of the spacers 304 of the jig 302, and the upper surface 602 of the back iron 404. As illustrated, the assembly 500 may be arranged with respect to the magnet placement device 700 such that the upper surface 906 of the slide table 708 is positioned at or above an upper surface 910 of the rim 402 of the back iron 404, thus allowing the magnet segment 206a to slide over the rim 402 and toward the cavity 908. As noted previously, in alternate implementations, the rim 402 may be a component of the jig 302, rather than the back iron 404.

As shown in FIG. 9B, after the magnet segment 206a has been pushed (by the push block 702) into the cavity 908, gravity and/or the attractive force between the magnet segment 206a and the back iron 404 may cause a second end 912 of the magnet segment 206a to move toward the upper surface 602 of the back iron 404. When the second end 912 of the magnet segment 206a contacts the elastic member, e.g., the O-ring 306, the elastic member may deform sufficiently to allow the first end 904 of the magnet segment 206a to move past an inner edge 914 of the rim 402. As indicated by an arrow 916 in FIG. 9B, once the first end 904 of the magnet segment 206a has been pushed past the inner edge 914 of the rim 402, gravity and/or the attractive force between the magnet segment 206a and the back iron 404 may cause the first end 904 of the magnet segment 206a to move toward the upper surface 602 of the back iron 404.

As shown in FIG. 9C, the first end 904 of the magnet segment 206a may move downward until a bottom portion 918 of the magnet segment 206a becomes flush with the upper surface 602 of the back iron 404. In such a configuration, the elasticity of the elastic member, e.g., the O-ring 306, may serve to press the first end 904 of the magnet segment 206a against the inner edge 914 of the rim 402. As noted previously, in some implementations, an adhesive may be applied to the upper surface 602 of the back iron 404 and/or the bottom portion 918 of the magnet segment 206a before the magnet segment 206a is pushed onto the back iron 404, and, while such an adhesive is in an uncured state, it may act as a lubricant to facilitate the movement of the magnet segment 206a along the upper surface 602 toward the inner edge 914 of the rim 402 due to the elastic force exerted by the elastic member, e.g., the O-ring 306.

Figure 10:
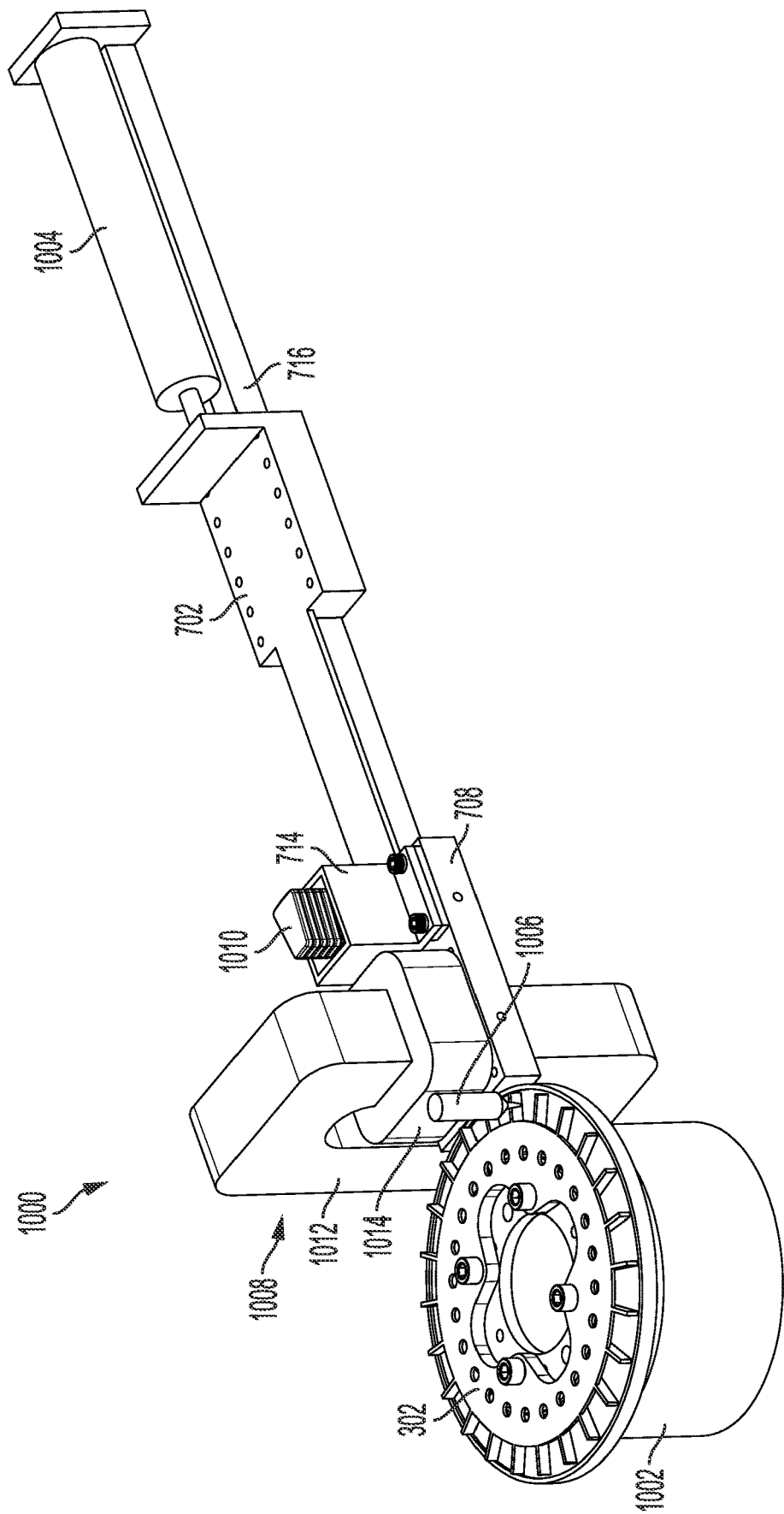
FIG. 10 is a perspective view of an example magnet placement device that includes a number of possible enhancements as compared to the magnet placement device shown in FIGS. 7 and 8, in accordance with some embodiments of the present disclosure.

FIG. 10 shows an example magnet placement device 1000 that includes a number of possible enhancements as compared to the magnet placement device 700 shown in FIGS. 7 and 8. As shown in FIG. 10, in some implementations, e.g., for large batch production, a rotatable device such as a rotary table 1002 may be used to automate rotation of the back iron 404 to present different pockets 504 to the end 706 of the slide table 708 for magnet segment 206 placement. Further, as also shown in FIG. 10, in some implementations, a linear actuator 1004 or ball screw mechanism may be used to cause the linear motion of the push block 702 along the guide rail 716, e.g., to separate the magnet segment 206a from the stack 704 and then push the magnet segment 206a into the pocket 504a/cavity 908 (as described above in connection with FIGS. 8 and 9A-C).

As additionally shown in FIG. 10, in some implementations, an adhesive dispenser 1006 may be employed to automate the application of the adhesive to the regions of the back iron 404 between the spacers 304 prior to placing the magnet segments 206 within the pockets 504.

Finally, and as also illustrated in FIG. 10, the magnet placement device 1000 may further be adapted to incorporate a magnetization jig 1008, thus allowing the use of unmagnetized magnet segments 1010 which are easier to ship and handle. The magnetization jig 1008 may include, for example, a coil 1012 to generate magnetic flux and a yoke 1014 to direct the magnetic flux axially through a magnet segment 206. As shown, in some implementations, the magnetization jig 1008 may be positioned between the magazine 714 and the jig 302, so that magnetization of individual magnet segments 206 may be performed, as additional step, after a magnet segment 206 is pushed out of the stack 704 and before the magnet segment 206 is slid onto the back iron 404 within a pocket 504. In some implementations, the magnetization jig 1008 may magnetize individual magnet segments 206 while they are sliding from the magazine 714 to the pocket 504. An advantage to employing such a magnetization jig 1008 is that both polarities of magnet segments 206 may be placed by the same linear pushing mechanism, with control electronics being used to alternate the direction of current through the coil 1012 to achieve alternating upwardly facing north and south poles. When unmagnetized magnet segments 1010 are employed, spacers (e.g., the spacers 710 shown in FIGS. 7 and 8) need not be included between the magnet segments, and a spacer ejector (e.g., the spacer ejector 712 shown in FIGS. 7 and 8) likewise need not be employed.

The magnet placement device 1000 may be easily adaptable to varying designs, as the rotary table 1002 may be CNC controlled and angular movements may be adjusted for pole count with a simple programing change. In some implementations, the magnetization jig 1008 may be significantly oversized so that it can accommodate a wide range of magnet types and sizes. Further, in some implementations, the adhesive dispenser 1006 may be programmable to dispense a different amount of adhesive depending on the size of the magnet segments 206. In some cases, the magnet placement device 1000 may be configured for a new rotor design by changing only the magazine 714 and the jig 302, and running a new program to control operations of the rotary table 1002 and the dispenser 1006.

Figure 11:
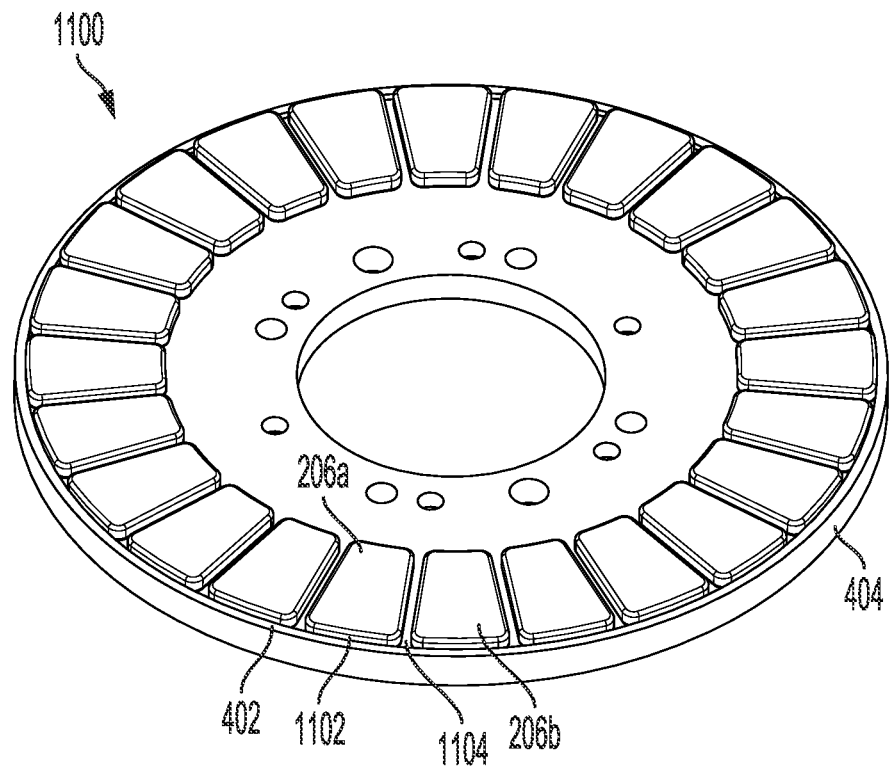
FIG. 11 shows a perspective view of an example rotor assembly that may be manufactured using the techniques disclosed herein, in accordance with some embodiments of the present disclosure.
Figure 12:
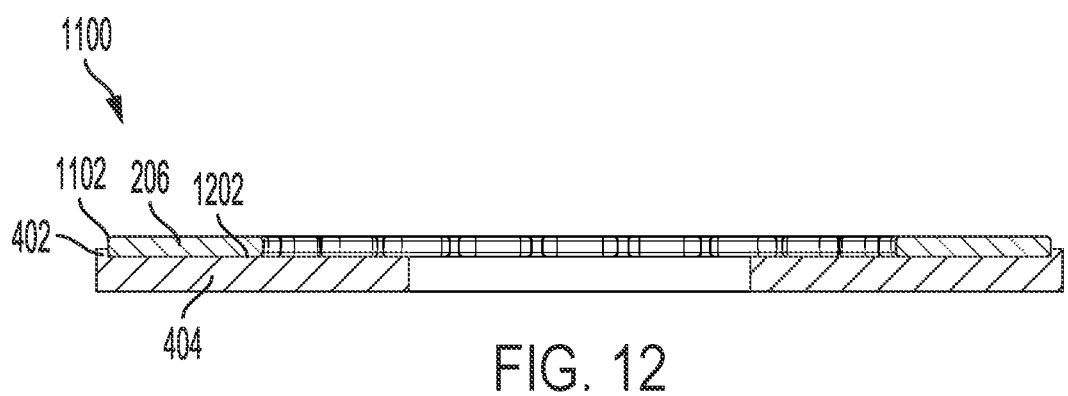
FIG. 12 shows a cross-sectional side view of the example rotor assembly shown in FIG. 11.

FIGS. 11 and 12 show a perspective view and a cross-sectional side view, respectively, of an example rotor assembly 1100 that may be manufactured using the techniques disclosed herein, i.e., after the magnet segments 206 have been placed within the pockets 504 and the jig 302 has been removed from the back iron 404. As illustrated, the rotor assembly 1100 may include the back iron 404 and a plurality of magnet segments 206 angularly distributed on the back iron 404, with outer ends 1102 of the magnet segments 206 abutting the rim 402 of the back iron 404. As shown in FIG. 11, adjacent pairs of the magnet segments 206, e.g., magnet segments 206a and 206b in FIG. 11, may be separated by gaps 1104 corresponding to the locations of the spacers 304 of the jig 302 that was previously attached to the back iron 404. As shown in FIG. 12, the magnet segments 206 may be held in place on the back iron 404 through the use of an adhesive that was applied at junctions 1202 between the bottoms of the magnet segments 206 and the respective locations of the upper surface 602 of the back iron 404 at which they were placed. Because the outer ends 1102 of the magnet segments contact the rim 402, the rim 402 may serve to resolve the centripetal force exerted on the individual magnet segments 206 when the rotor assembly 1100 rotates. Accordingly, in such an implementation, the adhesive may be relied upon solely to preclude angular displacement of the magnet segments 206.

As noted above, in some implementations, the jig 302 may be left in place on the back iron 404 after it is used to locate the magnet segments 206 and may be included as a component of the resulting rotor assembly. Accordingly, although not illustrated in FIGS. 11 and 12, it should be appreciated that in such implementations, the rotor assembly 1100 may additionally include the jig 302 as a component that is attached to the upper surface 602 of the back iron 404 (e.g., via screws 502 or other fasteners).

Further, as also noted above, in some implementations, the rim 402 may be a component of the jig 302, rather than the back iron 404. When such a jig 302 (including a rim 402) is left in place on the back iron 404 after it is used to locate the magnet segments 206, the rim 402 of the jig 302 may serve to resolve the centripetal force exerted on the individual magnet segments 206 when the rotor assembly rotates, similar to the manner in which a rim 402 integral with the back iron 404 may resolve such a force.

The following clauses describe examples of inventive concepts disclosed herein.

Clause A1. A method, comprising: affixing a jig to a first surface of a back iron for a rotor, the jig defining at least a first pocket to receive a magnet segment on the first surface; and after affixing the jig to the first surface, positioning a magnet segment on the first surface and within the first pocket.

Clause A2. The method of clause A1, further comprising: positioning the magnet segment against an outer rim of the back iron so that the outer rim restricts outward radial movement of the magnet segment.

Clause A3. The method of clause A2, further comprising: pressing a first end of the magnet segment against an elastic member within the first pocket so that force exerted by the elastic member pushes a second end of the magnet segment against the outer rim.

Clause A4. The method of clause A4, wherein the elastic member comprises an O-ring.

Clause A5. The method of clause A4, wherein the elastic member comprises a spring.

Clause A6. The method of any of clauses A1 through A5, further comprising: prior to positioning the magnet segment on the first surface, applying an adhesive to at least one of a bottom of the magnet segment or a region of the first surface within the first pocket.

Clause A7. The method of any of clauses A1 through A6, further comprising: removing the jig from the first surface.

Clause A8. The method of clause A7, further comprising: waiting for the adhesive to at least partially cure prior to removing the jig from the first surface.

Clause A9. The method of any of clauses A1 through A8, wherein positioning the magnet segment on the first surface further comprises: using a pushing member of a magnet placement device to push the magnet segment along a second surface of the magnet placement device and onto the first surface.

Clause A10. The method of clause A9, further comprising: prior to using the pushing member to push the magnet segment along the second surface, using the pushing member to push the magnet segment from a bottom of a stack of magnet segments.

Clause A11. The method of clause A10, further comprising: using the pushing member to push a spacer disposed between the magnet segment and another magnet segment in the stack of magnet segments, together with the magnet segment, toward the first pocket; and prior to using the pushing member to push the magnet segment onto the first surface, using a component of the magnet placement device to separate the spacer from the magnet segment.

Clause A12. The method of any of clauses A9 through A11, further comprising: prior to using the pushing member to push the magnet segment onto the first surface, using a magnetization jig of the magnet placement device to magnetize the magnet segment.

Clause A13. The method of any of clauses A9 through A12, further comprising: operating a linear actuator of the magnet placement device to drive the pushing member to push the magnet segment along the second surface and onto the first surface.

Clause A14. The method of any of clauses A9 through A13, further comprising: prior to positioning the magnet segment within the first pocket, attaching the back iron to a rotary table; and after affixing the jig to the first surface and attaching the back iron to the rotary table, operating the rotary table to rotate the first pocket to be aligned with an end of the magnet placement device.

Clause A15. The method of any of clauses A9 through A14, further comprising: prior to using the pushing member to push the magnet segment onto the first surface, using the magnet placement device to apply an adhesive to a region of the first surface within the first pocket.

Clause A16. The method of any of clauses A9 through A15, wherein the magnet placement device includes a soft magnetic member oriented along a linear path, and the method further comprises: using the pushing member to push the magnet segment along at least a portion of the second surface such that a magnetic attraction between the magnet segment and the soft magnetic member causes a longest axis of the magnet segment to align with the linear path.

Clause A17. The method of any of clauses A1 through A16, wherein the jig includes at least a first hole that corresponds to at least a second hole in the back iron, and the method further comprises: inserting a fastener at least partially through each of the first hole and the second hole to secure the jig to the back iron.

Clause A18. The method of any of clauses A1 through A17, wherein the jig includes a boss that is adapted to be mated with a center hole the back iron, and the method further comprises: mating the boss with the center hole to locate the jig on the back iron.

Clause B1. An apparatus, comprising: a jig adapted to be attached to a first surface of a back iron for a rotor, the jig being configured to define at least a first pocket to receive a magnet segment on the first surface when the jig is attached to the first surface.

Clause B2. The apparatus of clause B1, wherein the jig comprises an elastic member within the first pocket, the elastic member being configured and arranged to exert a force on a first end of the magnet segment when the magnet segment is inserted in the first pocket and thereby push a second end of the magnet segment against an outer rim of the back iron.

Clause B3. The apparatus of clause B2, wherein the elastic member comprises an O-ring.

Clause B4. The apparatus of clause B2, wherein the elastic member comprises a spring.

Clause B5. The apparatus of any of clauses B1 through B4, in combination with the back iron, wherein: the jig includes at least a first hole that corresponds to at least a second hole in the back iron; and a fastener is inserted at least partially through each of the first hole and the second hole to secure the jig to the back iron.

Clause B6. The apparatus of any of clauses B1 through B5, wherein the jig includes a boss configured to be mated with a center hole the back iron.

Clause B7. The apparatus of any of clauses B1 through B6, further comprising: a magnet placement device having a second surface and a pushing member, the pushing member being configured to push the magnet segment along the second surface and onto the first surface.

Clause B8. The apparatus of clause B7, wherein: the magnet placement device further comprises a magazine configured to hold a stack of magnet segments; and the pushing member is further configured to push the magnet segment from a bottom of the stack of magnet segments prior to pushing the magnet segment along the second surface.

Clause B9. The apparatus of clause B8, wherein: the pushing member is further configured to push a spacer disposed between the magnet segment and another magnet segment in the stack of magnet segments, together with the magnet segment, toward the first pocket; and the magnet placement device further comprises an ejection member configured to separate the spacer from the magnet segment before the pushing member pushes the magnet segment onto the first surface.

Clause B10. The apparatus of any of clauses B7 through B9, wherein the magnet placement device further comprises: a magnetization jig configured to magnetize the magnet segment before the pushing member pushes the magnet segment onto the first surface.

Clause B11. The apparatus of any of clauses B7 through B10, wherein the magnet placement device further comprises: a linear actuator configured to drive the pushing member to push the magnet segment along the second surface and onto the first surface.

Clause B12. The apparatus of any of clauses B7 through B11, wherein the magnet placement device further comprises: a rotary table configured to have the back iron attached thereto, the rotary table being configured to rotate the back iron, while the jig is attached to the back iron, so that the first pocket is aligned with an end of the magnet placement device.

Clause B13. The apparatus of any of clauses B7 through 12, wherein the magnet placement device further comprises: an adhesive dispenser configured and arranged to apply an adhesive to a region of the first surface within the first pocket before the pushing member pushes the magnet segment onto the first surface.

Clause B14. The apparatus of any of clauses B7 through B13, wherein the magnet placement device further comprises: a soft magnetic member oriented along a linear path, the soft magnetic member being configured and arranged to cause a longest axis of the magnet segment to align with the linear path as the pushing member pushes the magnet segment along at least a portion of the second surface.

Clause C1. A method, comprising: pressing a first end of a magnet segment against an elastic member located at an inner portion of a back iron for a rotor so that force exerted by the elastic member pushes a second end of the magnet segment against a rim located at an outer portion of the back iron.

Clause C2. The method of clause C1, further comprising: affixing a jig including the elastic member to a first surface of the back iron.

Clause C3. The method of clause C2, further comprising: prior to pressing the first end of the magnet segment against the elastic member, applying an adhesive to at least one of a bottom of the magnet segment or a portion of the back iron to which the magnet segment is to be attached.

Clause C4. The method of any of clauses C1 through C3, further comprising: removing the jig from the first surface after the second end of the magnet segment has been pushed against the rim.

Clause C5. The method of clause C4, further comprising: waiting for the adhesive to at least partially cure prior to removing the jig from the first surface.

Clause C6. The method of any of clauses C2 through C5, wherein the jig defines at least a first pocket to receive the magnet segment on the first surface.

Clause C7. The method of any of clauses C2 through C6, wherein the jig includes at least a first hole that corresponds to at least a second hole in the back iron, and the method further comprises: inserting a fastener at least partially through each of the first hole and the second hole to secure the jig to the back iron.

Clause C8. The method of any of clauses C2 through C8, wherein the jig includes a boss that is adapted to be mated with a center hole the back iron, and the method further comprises: mating the boss with the center hole to locate the jig on the back iron.

Clause C9. The method of any of clauses C1 through C8, further comprising: prior to pressing the first end of the magnet segment against the elastic member, applying an adhesive to at least one of a bottom of the magnet segment or a portion of the back iron to which the magnet segment is to be attached.

Clause C10. The method of any of clauses C1 through C9, further comprising: using a pushing member of a magnet placement device to push the magnet segment along a surface of the magnet placement device and onto the back iron, and to press the first end of the magnet segment against the elastic member.

Clause C11. The method of clause C10, further comprising: prior to using the pushing member to push the magnet segment along the surface of the magnet placement device, using the pushing member to push the magnet segment from a bottom of a stack of magnet segments.

Clause C12. The method of clause C11, further comprising: using the pushing member to push a spacer disposed between the magnet segment and another magnet segment in the stack of magnet segments, together with the magnet segment, toward the back iron; and prior to using the pushing member to push the magnet segment onto the back iron, using a component of the magnet placement device to separate the spacer from the magnet segment.

Clause C13. The method of any of clauses C10 through C12, further comprising: prior to using the pushing member to push the magnet segment onto the back iron, using a magnetization jig of the magnet placement device to magnetize the magnet segment.

Clause C14. The method of any of clauses C10 through C13, further comprising: operating a linear actuator of the magnet placement device to drive the pushing member to push the magnet segment along the surface of the magnet placement device and onto the back iron.

Clause C15. The method of any of clauses C10 through C14, further comprising: prior to using the pushing member to push the magnet segment onto the back iron, using an adhesive applicator of the magnet placement device to apply an adhesive to a portion of the back iron to which the magnet segment is to be attached.

Clause C16. The method of any of clauses C10 through C15, wherein the magnet placement device includes a soft magnetic member oriented along a linear path, and the method further comprises: using the pushing member to push the magnet segment along a surface of the magnet placement device such that a magnetic attraction between the magnet segment and the soft magnetic member causes a longest axis of the magnet segment to align with the linear path.

Clause C17. The method of any of clauses C1 through C16, wherein the elastic member comprises an O-ring.

Clause C18. The method of any of clauses C1 through C16, wherein the elastic member comprises a spring.

Clause D1. A method, comprising: using a pushing member of a magnet placement device to push a magnet segment linearly along a first surface of the magnet placement device and onto a second surface of a back iron of a rotor.

Clause D2. The method of clause D1, further comprising: prior to using the pushing member to push the magnet segment along the first surface, using the pushing member to push the magnet segment from a bottom of a stack of magnet segments.

Clause D3. The method of clause D2, further comprising: using the pushing member to push a spacer disposed between the magnet segment and another magnet segment in the stack of magnet segments, together with the magnet segment, toward the back iron; and prior to using the pushing member to push the magnet segment onto the second surface, using a component of the magnet placement device to separate the spacer from the magnet segment.

Clause D4. The method of any of clauses D1 through D3, further comprising: prior to using the pushing member to push the magnet segment onto the second surface, using a magnetization jig of the magnet placement device to magnetize the magnet segment.

Clause D5. The method of any of clauses D1 through D4, further comprising: operating a linear actuator of the magnet placement device to drive the pushing member to push the magnet segment along the first surface and onto the second surface.

Clause D6. The method of any of clauses D1 through D5, further comprising: prior to using the pushing member to push the magnet segment onto the second surface, using an adhesive applicator of the magnet placement device to apply an adhesive to a portion of the back iron to which the magnet segment is to be attached.

Clause D7. The method of any of clauses D1 through D6, wherein the magnet placement device includes a soft magnetic member oriented along a linear path, and the method further comprises: using the pushing member to push the magnet segment along at least a portion of the first surface such that a magnetic attraction between the magnet segment and the soft magnetic member causes a longest axis of the magnet segment to align with the linear path.

Clause E1. An apparatus, comprising: a first surface; a pushing member; and a linear actuator configured to drive the pushing member to push a magnet segment linearly along a first surface and onto a second surface of a back iron of a rotor.

Clause E2. The apparatus of clause E1, further comprising: a magazine configured to hold a stack of magnet segments; wherein the pushing member is configured and arranged to push the magnet segment from a bottom of the stack of magnet segments prior to pushing the magnet segment onto the second surface.

Clause E3. The apparatus of clause E2, wherein: the pushing member is configured and arranged to push a spacer disposed between the magnet segment and another magnet segment in the stack of magnet segments, together with the magnet segment, toward the back iron; and the apparatus further comprises an ejection member configured to separate the spacer from the magnet segment before the pushing member pushes the magnet segment onto the second surface.

Clause E4. The apparatus of any of clauses E1 through E3, further comprising: a magnetization jig configured to magnetize the magnet segment before the pushing member pushes the magnet segment onto the second surface.

Clause E5. The apparatus of any of clauses E1 through E4, further comprising: a rotary table configured to have the back iron attached thereto, the rotary table being configured to rotate the back iron after the pushing member pushes the magnet segment onto the second surface.

Clause E6. The apparatus of any of clauses E1 through E5, further comprising: an adhesive dispenser configured and arranged to apply an adhesive to a region of the first surface to which the magnet segment is to be attached before the pushing member pushes the magnet segment onto the first surface.

Clause E7. The apparatus of any of clauses E1 through E6, further comprising: a soft magnetic member oriented along a linear path, the soft magnetic member being configured and arranged to cause a longest axis of the magnet segment to align with the linear path as the pushing member pushes the magnet segment along at least a portion of the first surface.

Clause F1. A method, comprising: sliding a magnet segment linearly along a first surface and onto a second surface of a back iron of a rotor, wherein the first surface is disposed at or above a rim that extends upwardly from the second surface at an outer edge of the back iron to enable the magnet segment to slide over the rim before the magnet segment is slid onto the second surface.

Clause F2. The method of clause F1, further comprising: positioning the magnet segment against the rim so that the rim restricts outward radial movement of the magnet segment.

Clause F3. The method of clause F1 or F2, wherein the rim is integral with the back iron.

Clause F4. The method of any of clauses F1 through F3, further comprising: prior to sliding the magnet segment onto the second surface, affixing a jig to the second surface, the jig defining at least a first pocket to receive the magnet segment on the second surface.

Clause F5. The method of clause F4, further comprising: pressing a first end of the magnet segment against an elastic member within the first pocket so that force exerted by the elastic member pushes a second end of the magnet segment against the rim.

Clause F6. The method of clause F5, wherein the elastic member comprises an O-ring.

Clause F7. The method of any of clauses F4 through F6, further comprising: prior to sliding the magnet segment onto the second surface, applying an adhesive to at least one of a bottom of the magnet segment or a region of the second surface within the first pocket.

Clause F8. The method of any of clauses F4 through F7, further comprising: removing the jig from the second surface.

Clause F9. The method of clause F8, further comprising: waiting for the adhesive to at least partially cure prior to removing the jig from the second surface.

Clause F10. The method of any of clauses F4 through F9, further comprising: using a pushing member of a magnet placement device to push the magnet segment along the first surface and onto the second surface within the first pocket.

Clause F11. The method of clause F10, further comprising: prior to using the pushing member to push the magnet segment along the first surface, using the pushing member to push the magnet segment from a bottom of a stack of magnet segments.

Clause F12. The method of clause F11, further comprising: using the pushing member to push a spacer disposed between the magnet segment and another magnet segment in the stack of magnet segments, together with the magnet segment, toward the first pocket; and prior to using the pushing member to push the magnet segment onto the second surface, using a component of the magnet placement device to separate the spacer from the magnet segment.

Clause F13. The method of any of clauses F10 through F12, further comprising: prior to using the pushing member to push the magnet segment onto the second surface, using a magnetization jig of the magnet placement device to magnetize the magnet segment.

Clause F14. The method of any of clauses F10 through F13, wherein the magnet placement device includes a soft magnetic member oriented along a linear path, and the method further comprises: using the pushing member to push the magnet segment along at least a portion of the first surface such that a magnetic attraction between the magnet segment and the soft magnetic member causes a longest axis of the magnet segment to align with the linear path.

Clause F15. The method of any of clauses F10 through F14, further comprising: prior sliding the magnet segment along the first surface and onto the second surface, attaching the back iron to a rotary table; and after affixing the jig to the second surface and attaching the back iron to the rotary table, operating the rotary table to rotate the first pocket to be aligned with an end of the magnet placement device.

Clause F16. The method of any of clauses F4 through F15, wherein the rim is a component of the jig.

Clause G17. A method, comprising: pressing a first end of a magnet segment against an elastic member located at an inner portion of a back iron for a rotor so that force exerted by the elastic member pushes a second end of the magnet segment against a rim located at an outer portion of the back iron.

Clause G18. The method of clause G17, further comprising: affixing a jig including the elastic member to a surface of the back iron to which the magnet segment is to be attached.

Clause G19. The method of clause G17 or G18, further comprising: prior to pressing the first end of the magnet segment against the elastic member, applying an adhesive to at least one of a bottom of the magnet segment or a surface of the back iron to which the magnet segment is to be attached.

Clause G20. The method of any of clauses G17 through G19, wherein the elastic member comprises an O-ring.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including." "comprising" or "having" "containing" "involving" and variations thereof herein, is meant to encompass the items listed thereafter and equivalents thereof as well as additional items.

What is claimed is:

1. A method, comprising:
affixing a jig including an elastic member to a back iron for a rotor so that the elastic member is positioned at an inner portion of the back iron;
after affixing the jig to the back iron, moving a magnet segment relative to the back iron so that the magnet segment comes into contact with the elastic member; and
pressing a first end of the magnet segment against the elastic member so that force exerted by the elastic member pushes a second end of the magnet segment against a rim located at an outer portion of the back iron.

2. The method of claim 1, further comprising:
prior to pressing the first end of the magnet segment against the elastic member, applying an adhesive to at least one of a bottom of the magnet segment or a surface of the back iron to which the magnet segment is to be attached.

3. The method of claim 1, wherein the elastic member comprises an O-ring.

4. The method of claim 1, wherein:
moving the magnet segment relative to the back iron comprises sliding the magnet segment linearly along a first surface and onto a second surface of the back iron to cause the magnet segment to contact the elastic member;
the rim extends upwardly from the second surface at the outer portion; and
the first surface is disposed at or above the rim to enable the magnet segment to slide over the rim before the magnet segment is slid onto the second surface.

5. The method of claim 4, further comprising:
using a pushing member of a magnet placement device to push the magnet segment along the first surface and onto the second surface.

6. The method of claim 5, further comprising:
prior to using the pushing member to push the magnet segment along the first surface, using the pushing member to push the magnet segment from a bottom of a stack of magnet segments.

7. The method of claim 6, further comprising:
using the pushing member to push a spacer disposed between the magnet segment and another magnet segment in the stack of magnet segments, together with the magnet segment, toward the back iron; and
prior to using the pushing member to push the magnet segment onto the second surface, using a component of the magnet placement device to separate the spacer from the magnet segment.

8. The method of claim 5, further comprising:
prior to using the pushing member to push the magnet segment onto the second surface, using a magnetization jig of the magnet placement device to magnetize the magnet segment.

9. The method of claim 5, wherein the magnet placement device includes a soft magnetic member oriented along a linear path, and the method further comprises:
- using the pushing member to push the magnet segment along at least a portion of the first surface such that a magnetic attraction between the magnet segment and the soft magnetic member causes a longest axis of the magnet segment to align with the linear path.

10. The method of claim 4, wherein affixing the jig to the back iron comprises:
- affixing the jig to the second surface so that the jig defines at least a first pocket to receive the magnet segment on the second surface.

11. The method of claim 10, wherein:
- the elastic member is disposed on the jig so that, when the jig is affixed to the second surface, a portion of the elastic member is located in the first pocket at the inner portion of the back iron.

12. The method of claim 11, wherein the elastic member comprises an O-ring.

13. The method of claim 10, further comprising:
- prior to sliding the magnet segment onto the second surface, applying an adhesive to at least one of a bottom of the magnet segment or a region of the second surface within the first pocket.

14. The method of claim 13, further comprising:
- after sliding the magnet segment onto the second surface, removing the jig from the second surface.

15. The method of claim 14, further comprising:
- waiting for the adhesive to at least partially cure prior to removing the jig from the second surface.

16. The method of claim 10, further comprising:
- using a pushing member of a magnet placement device to push the magnet segment along the first surface and onto the second surface within the first pocket.

17. The method of claim 16, further comprising:
- prior to using the pushing member to push the magnet segment along the first surface, using the pushing member to push the magnet segment from a bottom of a stack of magnet segments.

18. The method of claim 17, further comprising:
- using the pushing member to push a spacer disposed between the magnet segment and another magnet segment in the stack of magnet segments, together with the magnet segment, toward the first pocket; and
- prior to using the pushing member to push the magnet segment onto the second surface, using a component of the magnet placement device to separate the spacer from the magnet segment.

19. The method of claim 16, further comprising:
- prior to using the pushing member to push the magnet segment onto the second surface, using a magnetization jig of the magnet placement device to magnetize the magnet segment.

20. The method of claim 16, wherein the magnet placement device includes a soft magnetic member oriented along a linear path, and the method further comprises:
- using the pushing member to push the magnet segment along at least a portion of the first surface such that a magnetic attraction between the magnet segment and the soft magnetic member causes a longest axis of the magnet segment to align with the linear path.

21. The method of claim 16, further comprising:
- prior sliding the magnet segment along the first surface and onto the second surface, attaching the back iron to a rotary table; and
- after affixing the jig to the second surface and attaching the back iron to the rotary table, operating the rotary table to rotate the first pocket to be aligned with an end of the magnet placement device.

22. The method of claim 10, wherein the rim is a component of the jig.

23. The method of claim 1, wherein:
- the rim is configured and arranged to restrict outward radial movement of the magnet segment when the rotor rotates about an axis of rotation.

24. The method of claim 1, wherein the rim is integral with the back iron.

* * * * *